United States Patent [19]
Bremer

[11] Patent Number: 5,642,379
[45] Date of Patent: Jun. 24, 1997

[54] TECHNIQUE FOR MODULATING ORTHOGONAL SIGNALS WITH ONE OR MORE ANALOG OR DIGITAL SIGNALS

[75] Inventor: Gordon Bremer, Clearwater, Fla.

[73] Assignee: Paradyne Corporation, Largo, Fla.

[21] Appl. No.: 378,766

[22] Filed: Jan. 26, 1995

Related U.S. Application Data

[63] Continuation of Ser. No. 76,526, Jun. 14, 1993, abandoned.

[51] Int. Cl.$^6$ ............................................ H04J 3/17
[52] U.S. Cl. ........................ 375/216; 370/528; 375/261
[58] Field of Search ............................ 375/216, 231, 375/260, 261; 370/20, 80, 111

[56] References Cited

U.S. PATENT DOCUMENTS

| | | | |
|---|---|---|---|
| 3,614,623 | 10/1971 | McAuliffe | 375/261 |
| 3,715,666 | 2/1973 | Mueller et al. | 375/231 |
| 4,358,853 | 11/1982 | Qureshi | 375/261 |
| 4,512,013 | 4/1985 | Nash et al. | 370/69.1 |
| 4,546,212 | 10/1985 | Crowder, Sr. | 179/2 C |
| 4,630,286 | 12/1986 | Betts | 375/261 |
| 4,672,602 | 6/1987 | Hargrave et al. | 370/58 |
| 4,757,495 | 7/1988 | Decker et al. | 370/76 |
| 4,924,516 | 5/1990 | Bremer et al. | 380/46 |
| 5,081,647 | 1/1992 | Bremer | 375/5 |
| 5,103,227 | 4/1992 | Betts | 341/61 |

OTHER PUBLICATIONS

M.N.Y. Shum et al., "A New Generation of Speech Plus Data Multiplexer," *Conference on Communications and Equipment and Systems*, Birmingham, England, Apr. 4–7, 1978, pp. 111–113.

Lockhart, et al., "Method for Superimposing Data on Amplitude–Modulated Signals," *Electronics Letters*, vol. 18, No. 9, Apr. 29, 1982, pp. 379–381.

V.E. Bukhviner, "Speech and Data Transmission in ACS Telephone Channels," *Telecommunication & Radio Eng.*, vol. 30/31, Jul. 1976, pp. 66–70.

P.F. Adams, "Speech–Band Data Modems," *Electronics & Power*, vol. 26, No. 9, Sep. 1980, pp. 733–736.

A. Peled and A. Ruiz, "Frequency Domain Data Transmission Using Reduced Computational Complexity Algorithms," *ICASSP 80 Proc.*, Denver, Colorado, vol. 1, Apr. 9–11, 1980, pp. 964–967.

L.J. Stagg and D. Clothier, "An Integrated Digital Subscribers Speech and Data Service," *ICC Conf. Rec.*, vol. 3, Seattle, Washington, Jun. 8–12, 1980, pp. 39.6.1–39.6.6.

B. Widrow, et al., "Adaptive Noise Cancelling: Principles and Applications," *Proceedings of the IEEE*, vol. 63, No. 12, Dec. 1975, pp. 1692–1716.

R. Steele and D. Vitello, "Simultaneous Transmission of Speech and Data Using Code–Breaking Techniques," *The Bell System Technical Journal*, vol. 60, No. 9, Nov. 1981, pp. 2081–2105.

F. Akashi, et al., "High–Speed Digital and Analog Parallel Transmission Technique Over Single Telephone Channel," *IEEE Transactions on Communications*, vol. COM–30, No. 5, May 1982, pp. 1213–1218.

T.L. Lim and M.S. Mueller, "Adaptive Equalization and Phase Tracking for Simultaneous Analog/Digital Data Transmission," *The Bell System Technical Journal*, vol. 60, No. 9, pp. 2039–2063, Nov. 1981.

*Primary Examiner*—Benedict V. Safourek
*Attorney, Agent, or Firm*—Thomas, Kayden, Horstemeyer & Risley

[57] ABSTRACT

An arrangement for modulating orthogonal signals with an analog signal or a digital information signal. In either event, the information signal is partitioned into component signals which respectively modulate an associated one of the orthogonal signals. The analog signal has a predetermined bandwidth and may be represented by samples generated at no less than a predetermined rate. The component signals derived from this analog signal, on the other hand, may be represented by samples generated at a rate which is less than the predetermined rate. Apparatus is incorporated which detects a predetermined event which, in turn, determines whether the orthogonal signals are modulated by the analog or digital information signal. The value of the latter signal may be known at any time, such as when the digital information signal is a training sequence, or may be unknown. The foregoing modulation arrangement can also incorporate privacy or encryption schemes.

26 Claims, 5 Drawing Sheets

200

FIG. 3  P/O 102
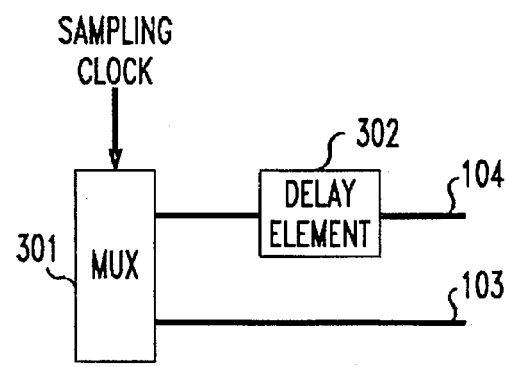
FIG. 4  P/O 102
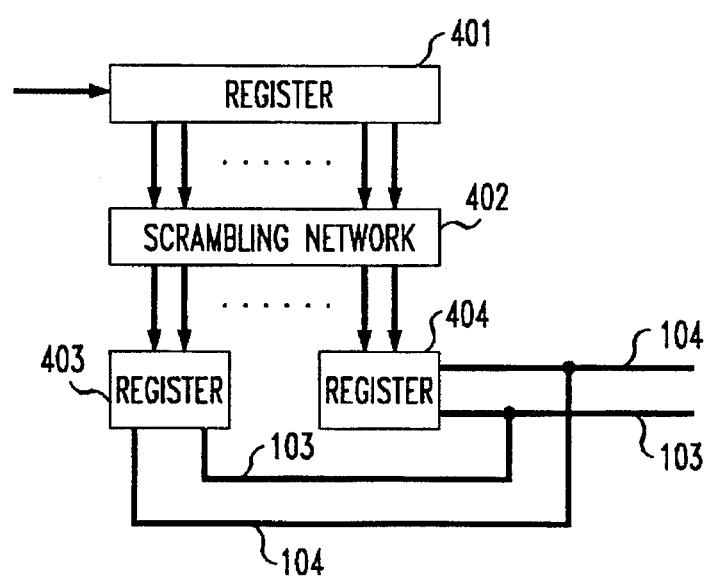

TECHNIQUE FOR MODULATING ORTHOGONAL SIGNALS WITH ONE OR MORE ANALOG OR DIGITAL SIGNALS

CROSS REFERENCE TO RELATED APPLICATIONS

This application is a continuation of application Ser. No. 08/076,526 filed on Jun. 14, 1993, now abandoned.

TECHNICAL FIELD

The present invention relates to a modulation technique and, more particularly, to the modulation of orthogonal signals with an analog information signal at certain times and a digital information signal at other times.

BRIEF DESCRIPTION OF THE DRAWING

Quadrature-related carrier signals have long been used to communicate analog signals through a communications facility. In the various known arrangements, two analog signals can directly modulate the quadrature-related carrier signals. Or, a single analog signal can be convened into digital signals or symbols and this digital equivalent of the analog signal modulates these carrier signals. It is also known that a digital information signal can modulate the quadrature-related carrier signals.

While these various arrangements provide satisfactory performance, there are applications where the costs associated with realizing quadrature amplitude modulation exceeds system cost objectives. In addition, there are other applications where the available bandwidth is constrained. In still other applications, there is a need to be able to transmit analog or digital information signals from various sources. It would therefore be deskable if an arrangement could be devised which overcomes the shortcomings of the prior art.

SUMMARY OF THE INVENTION

Figure 1:
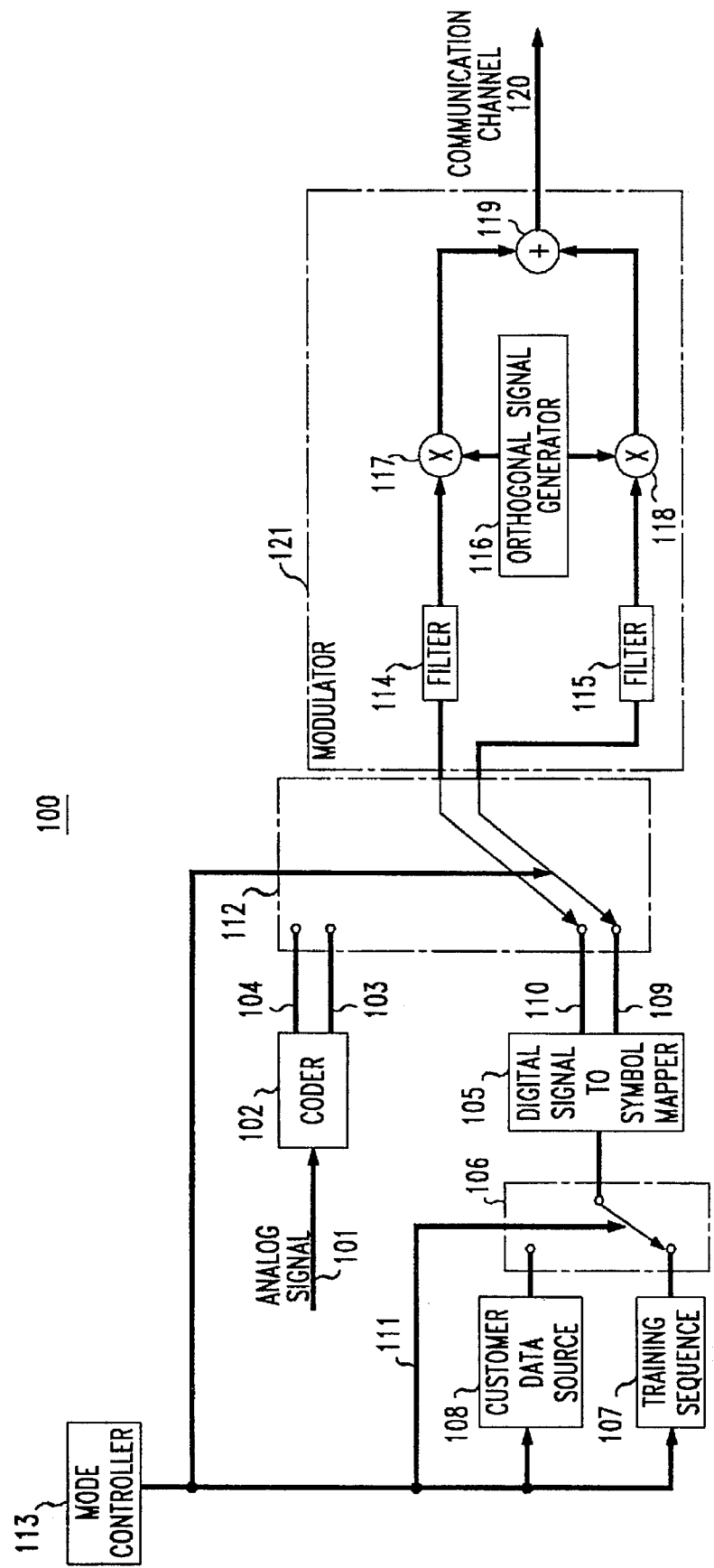

In accordance with the present invention, orthogonal signals are modulated with component signals derived from either an analog signal having a given bandwidth or a digital information signal. The analog signal can be represented by samples generated at no less than some predetermined rate while the component signals of this analog signal are representable by samples at a rate less than the predetermined rate. Advantageously, this modulation technique can incorporate privacy and/or encryption schemes.

In the disclosed embodiments, the analog signal is sampled to generate a sequence of analog signal samples. This sequence is then partitioned into two subsets with one subset of samples being transmitted via one of the orthogonal carrier signals and the other subset of samples being transmitted via the other carrier signal. Upon detection of a predetermined occurrence, this modulation is terminated and a digital information signal modulates the orthogonal carrier signals. The digital information signal can have a value at any time which is a priori known, such as a training sequence, or can have a value at any time which is not known, such as when the digital information signal is customer-supplied.

BRIEF DESCRIPTION OF THE DRAWING

Figure 2:
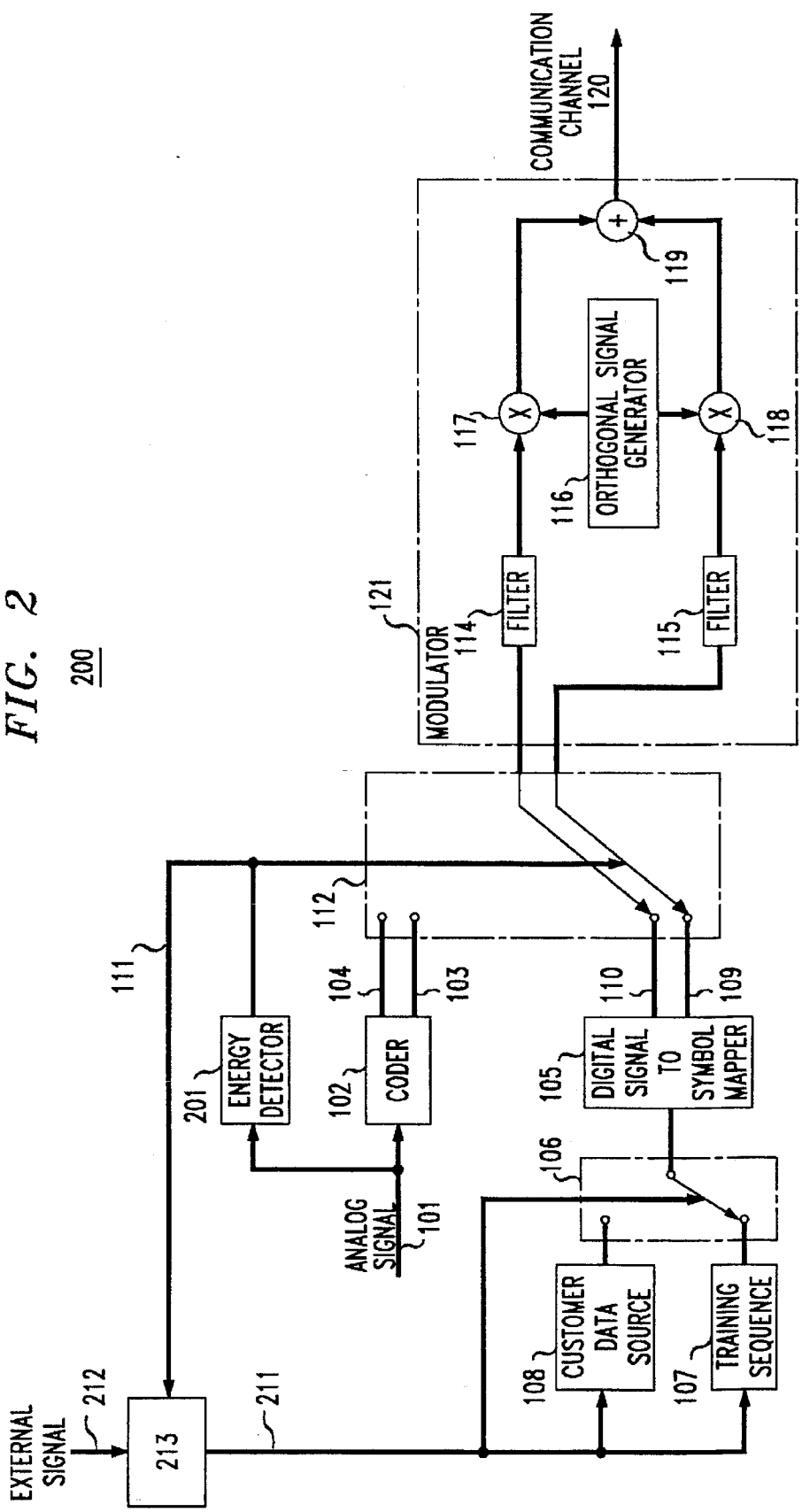
Figure 5:
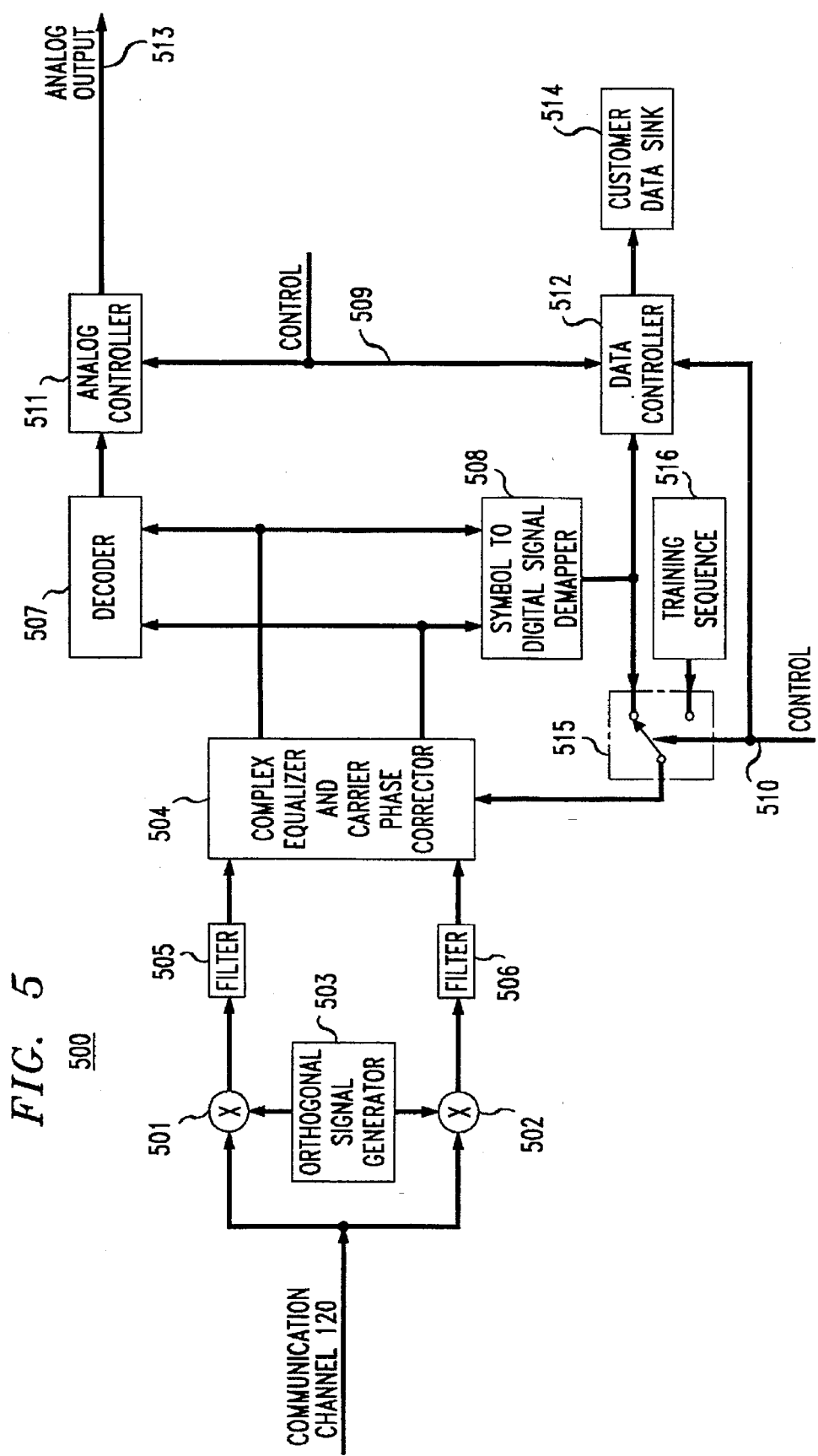
Figure 6:
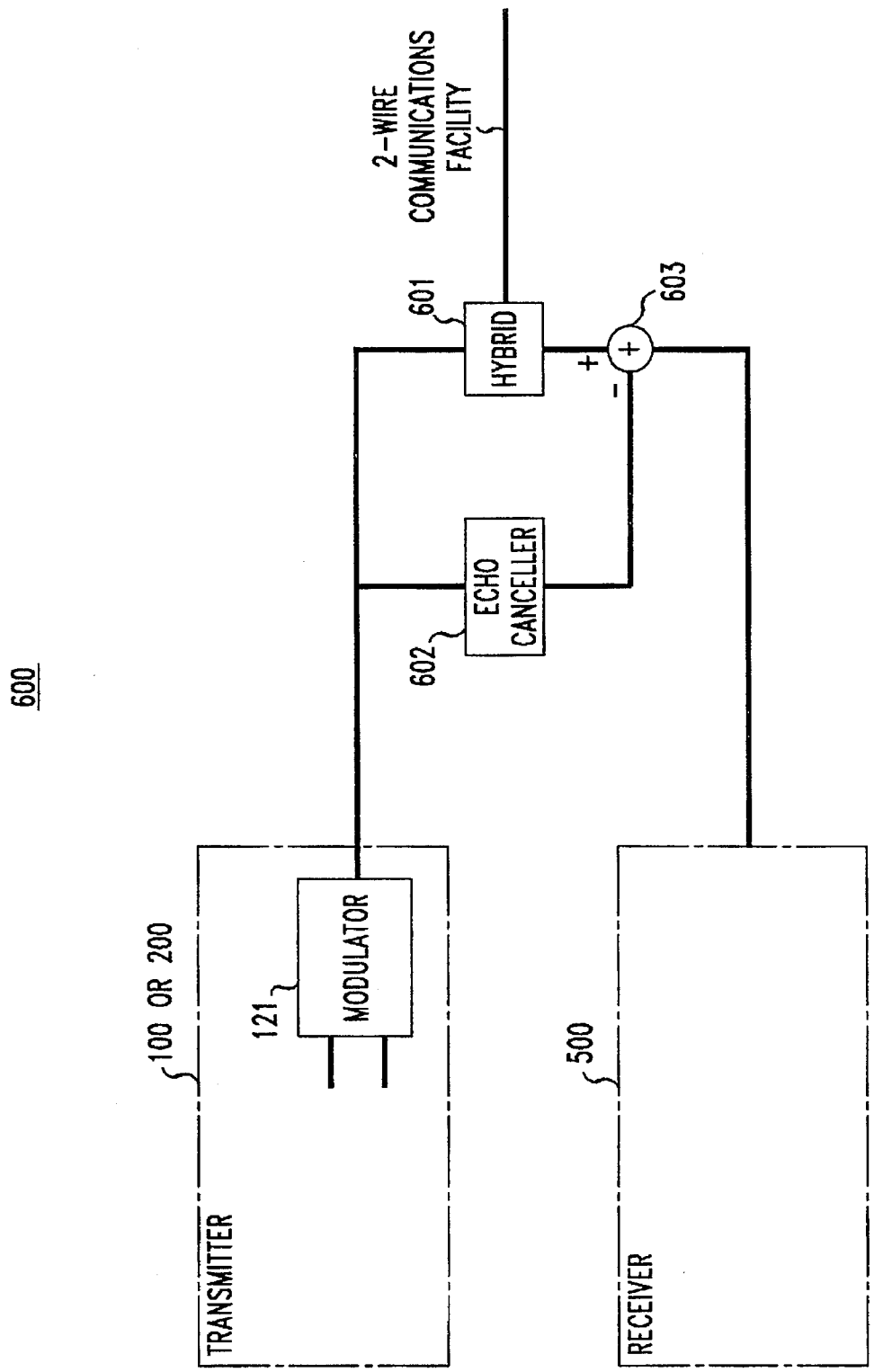

FIG. 1 is a block-schematic diagram of a first embodiment of a transmitter which incorporates the present invention;

FIG. 2 is a block-schematic diagram of a second embodiment of a transmitter which incorporates the present invention;

FIGS. 3 and 4 are block-schematic diagrams of alternate embodiments of a portion of coder 102 shown in FIGS. 1 and 2;

FIG. 5 is a block-schematic diagram of a receiver in accordance with the present invention; and FIG. 6 is a block-schematic diagram of a full-duplex modem in accordance with the present invention.

DETAILED DESCRIPTION

FIG. 1 shows a first embodiment of an illustrative transmitter 100 in accordance with the present invention. As shown, an analog signal on bus 101 is coupled to coder 102 which develops two analog signals therefrom. Also shown is digital signal-to-symbol mapper 105 which, depending on the state of switch 106, responds to digital signals provided from training sequence generator 107 or customer data source 108. Mapper 105 creates, in well-known fashion, two sequences of output pulses on leads 109 and 110. Each of these pulses has an amplitude which corresponds to the digital signal applied to mapper 105. As will be discussed, the state of switch 106, which determines whether the customer data source or the training sequence generator provides a digital signal to mapper 105, is controlled by a signal on bus 111 provided by mode controller 113. The mode controller also controls, via a signal on bus 111, the state of switch 112. In one state of this switch, the signals on leads 103 and 104 are respectively coupled to orthogonal modulator 121 while, in the other state, the signals on leads 109 and 110 are coupled to this modulator.

While generator 107 and source 108 each output digital signals, such signals differ in that the training sequence is a sequence of digital signals which are a priori known to the receiver. Training sequences are normally used to adapt certain equipment in the communications system, such as equalizers and echo cancellers. The digital signals provided by source 108, on the other hand, are not known to the receiver in advance and, in the disclosed embodiment, are supplied by one or more customers.

At this juncture it should be noted that while, in the foregoing description, coder 102 and mapper 105 each generate signals from an input signal, the present invention is not so limited. Indeed, coder 102 can convert a plurality of M inputs into N outputs, where M and N are different predetermined integers and mapper 105 can convert a plurality of M inputs into K outputs. In such circumstances, the orthogonal modulator in FIG. 1 which follows switch 112 can be constructed to be responsive to the plurality of outputs of coder 102 or mapper 105. More specifically, those elements must account for all of the applied input signals, and that means that they must be able to handle K or N signals, whichever is larger. In such a circumstance, however, the user can assume that the larger of K or N is the dimensionality of the system, with some of the dimensions having either no digital data, or no analog data, whichever applies. Of course, if there are "dimensions" for which there is not a digital or analog signal at a particular time, then other information can be sent over those dimensions, such as equalization "side" information.

In the context of a signal space, the N output signals of coder 102 and mapper 105 (assuming N is larger than K) correspond to the collection of vectors in a multidimensional space, i.e., N-dimensional space. The coordinates of this multidimensional space correspond to the orthogonal signals provided within orthogonal modulator 121. For purposes of this invention, orthogonal signals are signals that allow the receiver to separate the received signal into each of the modulated orthogonal signals.

Referring to FIG. 1, the signals on leads 103 and 104 or 109 and 110 are coupled to orthogonal modulator 121. Orthogonal modulator can be realized in a variety of ways, including analog or digital structures. A memory look-up table can also be used to provide a sequence of digital representations of the modulated orthogonal signals which would then be coupled through an analog-to-digital (A/D) converter to generate the modulated orthogonal signals. In the illustrative orthogonal modulator 121, filters 114 and 115 filter their respective input signals and couple these filtered signals to multipliers 117 and 118. Each multiplier combines the output of it associated filter with an associated orthogonal signal provided by orthogonal signal generator 116. In this embodiment, two orthogonal signals and, specifically, cos ωt and sin ωt, are provided by orthogonal signal generator 116. Of course, other orthogonal signals, such as code division multiplexing (CDMA) templates may be used. Summer 119 algebraically combines the outputs of multipliers 117 and 118 and couples this combination to communications channel 120.

Reviewing the signal processing thus far described, the signal coupled to communications channel 120 is the sum of two orthogonal signals, each such signal being modulated by an associated analog signal when the output of coder 102 is coupled to orthogonal modulator 121 or is modulated by a digital symbol when mapper 105 is connected to modulator 121. Mode controller 113 determines what type of signal, i.e., analog or digital, is coupled to orthogonal modulator at any time and also determines which digital signal, i.e., training or customer-supplied, is outputted. In order for the receiver to detect whether the received signal is representative of the analog signal on bus 101, the digital signal from customer data source 108 or the training sequence generator 107, coder 102 inserts a mode signal which identifies the signal which follows as originating from bus 101. Similarly, generator 107 and source 108 also insert mode signals which identify the signal which follows as a digital signal and also identifies whether this signal originated from generator 107 or source 108.

Controller 113 can be responsive to a variety of conditions, such as time of day or a predetermined error condition indicating the need to train or retrain certain equipment, etc. One likely condition is related to the signal energy level on bus 101 and a transmitter arrangement 200 utilizing this criteria is shown in FIG. 2.

The arrangement shown in FIG. 2 incorporates a substantial portion of the circuit elements used in FIG. 1 and each of these elements provides the same function and bears the same reference numerals in FIG. 2. In transmitter 200, energy detector 201 provides some of the functions provided by mode controller 113 in FIG. 1. Specifically, detector 201 monitors the signal energy level on bus 101 and outputs a control signal on bus 111 which controls the state of switch 112. This control signal is provided when the monitored energy level fails to meet a predetermined condition. For example, this predetermined condition can correspond to the signal energy level on bus 101 falling below a certain level which indicates the absence or near absence of the analog signal. Energy detector 201 also provides its control signal on bus 111 to mode converter 213. Converter 213, once enabled by this control signal, provides an output on bus 211 which tracks the state of an applied external signal on lead 212. The output signal on bus 211 activates either customer data source 108 or training sequence generator 107 and toggles switch 106 to couple the signal from the activated source or generator to mapper 105. As a result, when the analog signal on bus 101 does not possess a predetermined energy level, a training sequence or customer digital data is transmitted.

While in the disclosed embodiment of FIG. 1, the signal on bus 101 is an analog signal, the present invention is also applicable for other types of signals. For example, pursuant to conventional techniques, an analog signal that is band-limited can be sampled (within the proper Nyquist bounds) so that coder 102 incorporates a sampler whose outputted sequence of analog signal samples is coded. Or, for example, the amplitude of each such analog signal sample may be quantized by coupling the sequence of analog signal samples through a quantizer disposed in coder 102 prior to coding. In this case, the coding is operative upon a quantized pulse amplitude modulated pulse or a digital representation of each analog signal sample.

The use of sampling and amplitude quantization of the analog signal input on bus 101 offers a number of benefits. For one, a quantized analog signal sample provides a digital input to the coding apparatus. For another, the use of such samples permits the coding apparatus to be readily supplied with analog signals from different sources via a demultiplexer.

The fact that the input to coder 102 is digital and that the input to mapper 105 is also digital should not be confused. The digital input to mapper 105 is a stream of digits that are each equally important. Hence, the digits are converted into symbols and the symbols into constellation points in a signal space diagram. In contradistinction, the digital signals applied to coder 102 correspond to digital words that represent amplitude, and the specific interrelationship between adjacent bits of the digital words is maintained.

The partitioning of the M analog signals on bus 101 into N analog signals or N representations of this analog signal can be provided using a number of techniques. FIG. 3 shows one such arrangement wherein the analog signal is sampled and the sequence of samples is coupled, in alternation, to leads 103 and 104. As a result, the odd-numbered samples in the sequence are coupled to one lead and the even numbered samples are coupled to another so that the signals on leads 103 and 104 are adjacent analog signal samples. As shown in FIG. 3, to accomplish this partitioning, coder 102 incorporates multiplexer 301 which is clocked by the sampling clock and couples adjacent samples to different output leads. Delay element 302 imparts a sample period delay so that a pair of samples is simultaneously supplied to leads 103 and 104.

While the use of a fixed partitioning may result in an improvement in analog signal space signal-to-noise and spectral content for certain applications, partitioning utilizing a varying pairing procedure can provide privacy or encryption. FIG. 4 shows one such arrangement for providing this capability.

As shown in FIG. 4, coder 102 basically includes an input register 401 for storing S analog samples that arrive at a rate 2T, a scrambling network 402 that scrambles the output of register 401 and develops S outputs, and a pair of registers 403 and 404 that are responsive to the outputs of the scrambling network. Registers 403 and 404 store S/2 analog samples every S/2T seconds and output the stored samples at a rate 1/2T seconds on leads 104 and 103. The scrambling provided by network 402 can be in accordance with a number of procedures including, for example, the use of a pseudorandom sequence. In such case, the time order of the analog signal samples outputted by register 401 are rearranged relative to their inputted time order, i.e., the time order of the analog signal samples inputted to this register. Or, the analog signal samples stored in register 401 can have their magnitude and/or polarity altered in accordance with well-known techniques.

Refer now to FIG. 5. Within receiver 500, the incoming signals from communications channel 120 are coupled to multipliers 501 and 502 which respectively demodulate the incoming signal using orthogonal signals provided by orthogonal signal generator 503. In the disclosed embodiment, these orthogonal signals are the sin ωt and cos ωt. The demodulated outputs of each multiplier are then supplied to adaptive complex equalizer and carrier phase corrector 504 via low-pass filters 505 and 506. Equalizer and phase corrector 504 including cross-coupled transversal filters having complex-valued coefficients compensates, in well-known fashion, for the linear distortion introduced in the communications channel and the phase and frequency offset between the orthogonal signals provided by generator 503 and its counterpart, generator 116, in the transmitter. The pair of outputs provided by the equalizer and phase corrector 504 are coupled to decoder 507 and symbol-to-digital-signal demapper 508. The decoder and demapper function in a manner complementary to their respective counterparts, i.e., coder 102 and mapper 105 in the transmitter.

As discussed, a mode signal which identifies whether an analog signal from bus 101 or a digital signal from source 108 or generator 107 is transmitted to the receiver. In addition, this mode signal identifies whether the digital signal which follows is customer data or a training sequence. This mode signal can be communicated to the receiver in well-known fashion using the same frequency band as that utilized for analog or digital signal communications. Alternatively, this mode signal can be coupled to the receiver in a secondary channel and this channel can utilize the same or a different medium as that used for the analog or digital signal communications. It will be assumed for purposes of simplicity that the mode signal is coupled to the receiver via a secondary channel and well-known logic circuitry is used to provide a pair of binary control signals on leads 509 and 510. The logic state of the control signal on lead 509 indicates whether the signal received from the communications channel 120 is an analog or a digital one. The logic state of the signal on lead 510 indicates whether the digital signal represents customer data or a training sequence.

When the logic state of the control signal on lead 509 indicates the received signal is an analog one, switch 511 is closed and switch 512 is opened. As a result, an analog signal output is provided on lead 513. If, however, the logic state of the control signal on lead 509 indicates a digital signal and the logic state of the control signal on lead 510 indicates that this signal is representative of customer data, switch 512 is closed so that this signal is coupled to customer data sink 514. In addition, this logic state on lead 510 causes switch 515 to couple this customer data to equalizer and phase corrector 504 wherein it is used to update the complex-valued coefficients. When, however, the logic state on lead 510 indicates that the received signal is a training sequence, then switch 512 is opened and switch 515 is toggled to couple the output of training sequence generator 516 to equalizer and phase corrector 504. This operation advantageously provides the equalizer and phase corrector with the training sequence from generator 516 in lieu of estimates of this training sequence from demapper 508. It should be noted that in the foregoing arrangement the equalizer and phase corrector is continuously adapted using either the recovered customer data or the training sequence. Of course, other adaptive arrangements can be envisioned. For example, the equalizer and phase corrector could be updated only at times corresponding to the transmission of a training sequence.

FIG. 6 depicts an entire full-duplex modem 600 constructed in accordance with the present invention. More specifically, a transmitter 100 or 200 and a receiver section 500 respectively provide transmit and receive capability to and from a two-wire communications facility through hybrid 601. Preferably, echo canceller 602 and subtractor 603 are utilized to subtract unwanted signals from the input to receiver 500. For the sake of simplicity, echo canceller 602 is shown connected to the output of orthogonal modulator 121 and, in analog embodiments of the echo canceller, this is perfectly satisfactory. However, in digital echo canceller embodiments, it is well known that improvements can be attained by coupling the echo canceller with a lower rate signal. Such an improvement can be provided utilizing well-known techniques, such as the use of a carrier frequency rotator and Hilbert passband filters, to provide the function of modulator 121 in the transmitter and complementary apparatus in the receiver.

It should, of course, be noted that while the present invention has been described in terms of an illustrative embodiment, other arrangements will be apparent to those of ordinary skill in the art. For example, while the disclosed embodiments utilize discrete devices, the devices can be implemented using one or more appropriately programmed, general-purpose processors or special-purpose integrated circuits or digital processors or an analog or hybrid counterpart of any of these devices. Or, for example, while in the disclosed embodiments the analog signal is sampled to produce a sequence of samples and this sequence is partitioned, sampling of the analog signal is not necessary. The analog signal may be partitioned, for example, using filters so as to provide component signals each extending over a subset of the frequency range of the analog signal. Finally, still other arrangements are envisioned for the present invention. See for example, the copending application entitled "Simultaneous Analog and Digital Communication" by Bremer et al., filed even date herewith and assigned to the present assignee.

I claim:

1. Apparatus comprising
   first means for providing a plurality of first component signals from a bandlimited analog signal, said analog signal being representable by samples generated at no less than a predetermined rate and each component signal being representable by samples generated at a rate less than said predetermined rate;
   second means for providing a plurality of second component signals from a digital information signal; and
   means for modulating each orthogonal signal in a set of orthogonal signals with a corresponding one of said first component signals at certain times and for modulating each said orthogonal signal with a corresponding one of said second component signals at other times wherein said other time includes a time when the value of said digital signal is a priori known and also includes another time when the value of the digital signal is not known.

2. The apparatus of claim 1 wherein each of said first component signals is an analog signal.

3. The apparatus of claim 1 wherein said first providing means includes signal sampling means which forms a sequence of signal samples and assigns which of these samples modulate which orthogonal signal.

4. The apparatus of claim 3 wherein said modulating means utilizes alternate adjacent samples in said sequence to modulate different orthogonal signals in said set.

5. The apparatus of claim 3 wherein said modulating means utilizes alternate adjacent samples in said sequence at certain times to modulate the same orthogonal signal in said set.

6. The apparatus of claim 3 wherein said first providing means includes means for quantizing the amplitude of each sample to one of a plurality of threshold levels.

7. The apparatus of claim 1 wherein said first providing means includes means for scrambling said first component signals prior to their being used for modulating the orthogonal signals.

8. The apparatus of claim 1 wherein said scrambling means is responsive to a pseudorandom sequence.

9. The apparatus of claim 1 wherein said first providing means provides said first component signals by operating upon said analog signal in a fixed manner.

10. The apparatus of claim 1 wherein said first providing means provides said first component signals by operating upon said analog signal in a variable manner.

11. The apparatus of claim 1 wherein said other times correspond to the detection of a predetermined event and said apparatus includes means for detecting said event and controlling whether the first or second component signals modulate the orthogonal signals.

12. The apparatus of claim 1 further including means for detecting the signal energy associated with said analog signal and said other times corresponds to this energy being less than a predetermined amount.

13. The apparatus of claim 1 wherein said digital signal is received by said second providing means from a first source and a second different source.

14. A method comprising the steps of
providing a plurality of first component signals from a bandlimited analog signal, said analog signal being representable by samples generated at no less than a predetermined rate and each component signal being representable by samples generated at a rate less than said predetermined rate;
providing a plurality of second component signals from a digital information signal; and
modulating each orthogonal signal in a set of orthogonal signals with a corresponding one of said first component signals at certain times and for modulating each of said orthogonal signal with a corresponding one of said second component signals at other times wherein said other time includes a time when the value of said digital signal is a priori known and also includes another time when the value of the digital signal is not known.

15. Apparatus comprising
means for demodulating each orthogonal signal in a set of orthogonal signals to obtain a corresponding one of first component signals at certain times, and to obtain a corresponding one of second component signals at other times;
means for recovering a digital information signal from the second component signals; and
means for recovering an analog signal from said first component signals obtained by demodulating said orthogonal signals, each first component signal being representable by samples generated at less than a predetermined rate and said analog signal being representable by samples generated at no less than said predetermined rate wherein said other time includes a time when the value of said digital signal is a priori known and also includes another time when the value of the digital signal is not known.

16. The apparatus of claim 15 wherein each of said first component signals is an analog signal.

17. The apparatus of claim 15 wherein said analog signal recovering means forms a sequence of signal samples.

18. The apparatus of claim 17 wherein said analog signal recovering means forms alternate adjacent samples in said sequence from different orthogonal signals in said set.

19. The apparatus of claim 17 wherein said analog signal recovering means forms alternate adjacent samples in said sequence from a single orthogonal signal in said set.

20. The apparatus of claim 15 wherein said first analog signal recovering means includes a descrambler.

21. The apparatus of claim 20 wherein said descrambler is responsive to a pseudorandom sequence.

22. Apparatus comprising
means for receiving an analog input signal having a predetermined bandwidth and generating at least two first component signals each having an associated bandwidth less than said predetermined bandwidth;
means for providing at least two second component signals from a digital information signal; and
means for modulating each orthogonal signal in a set of orthogonal signals with a corresponding one of said first component signals at certain times and for modulating each set of orthogonal signals with a corresponding one of said second component signals at other times wherein said other time includes a time when the value of said digital signal is a priori known and also includes another time when the value of the digital signal is not known.

23. Apparatus comprising
means for demodulating each orthogonal signal in a set of orthogonal signals to obtain a corresponding one of first component signals at certain times, and to obtain a corresponding one of second component signals at other times;
means for recovering a digital information signal from the second component signals; and
means for recovering an analog signal from said first component signals obtained by demodulating said orthogonal signals, said analog signal having a predetermined bandwidth and each of said first component signals having an associated bandwidth that is less than said predetermined bandwidth wherein said other time includes a time when the value of said digital signal is a priori known and also includes another time when the value of the digital signal is not known.

24. A method comprising the steps of
receiving an analog input signal having a predetermined bandwidth and generating at least two first component signals each having an associated bandwidth less than said predetermined bandwidth;
providing at least two second component signals from a digital information signal;
modulating each orthogonal signal in a set of orthogonal signals with a corresponding one of said first component signals at certain times; and
modulating each set of orthogonal signals with a corresponding one of said second component signals at other times wherein said other time includes a time when the value of said digital signal is a priori known and also includes another time when the value of the digital signal is not known.

25. A method comprising the steps of
demodulating each orthogonal signal in a set of orthogonal signals to obtain a corresponding one of first component signals at certain times, and to obtain a corresponding one of second component signals at other times;

recovering a digital information signal from the second component signals; and recovering an analog signal from said first component signals obtained by demodulating said orthogonal signals, said analog signal having a predetermined bandwidth and each of said first component signals having an associated bandwidth that is less than said predetermined bandwidth wherein said other time includes a time when the value of said digital signal is a priori known and also includes another time when the value of the digital signal is not known.

26. A modem apparatus comprising:

means for receiving a data signal from a user of the modem apparatus to provide a digital signal;

means for coding a voice signal to provide N coded voice signals, where N>1;

means for mapping the digital signal to provide N mapped digital signals;

multiplexing means responsive to an energy level of the voice signal for switching between the N coded voice signals and the N mapped digital signals to provide N output signals; and means for modulating the N output signals to provide a modulated signal for transmission to an opposite endpoint.

* * * * *